United States Patent [19]
Maier et al.

[11] Patent Number: 5,151,241
[45] Date of Patent: Sep. 29, 1992

[54] METHOD FOR SHAPING WORKPIECES FROM THERMOPLASTICS

[75] Inventors: Dieter Maier; Harald Egner, both of Stuttgart; Stefan Frohlich, Mutlangen; Jurgen Hoffmann, Denkendorf, all of Fed. Rep. of Germany

[73] Assignee: Fraunhofer-Gesellschaft zur Forderung der Angewandten Forschung e.v., Munich, Fed. Rep. of Germany

[21] Appl. No.: 703,922

[22] Filed: May 22, 1991

[30] Foreign Application Priority Data

May 23, 1990 [DE] Fed. Rep. of Germany ....... 4016558
Mar. 22, 1991 [DE] Fed. Rep. of Germany ....... 4109370

[51] Int. Cl.⁵ ............................................. B29C 43/02
[52] U.S. Cl. ................................. 264/314; 264/322; 264/325; 425/DIG. 14
[58] Field of Search ............... 264/314, 320, 322, 325, 264/DIG. 41, DIG. 52; 425/DIG. 14

[56] References Cited

U.S. PATENT DOCUMENTS

3,833,699 9/1974 Stefanka ............................. 264/314
4,126,659 11/1978 Blad ................................... 264/314
4,144,632 3/1979 Stronpe .............................. 264/314
4,876,049 10/1989 Aoyama et al. ..................... 264/314

FOREIGN PATENT DOCUMENTS

279919 12/1987 Japan ................................. 264/322

*Primary Examiner*—James Lowe
*Attorney, Agent, or Firm*—Weingarten, Schurgin, Gagnebin & Hayes

[57] ABSTRACT

A method and device for shaping tubular workpieces from thermoplastic plastics is disclosed. In the method, the workpiece to be shaped is inserted into a mold, heat is applied from the interior of the workpiece to heat the workpiece to the softening temperature of the plastic, this temperature is maintained until the workpiece assumes the shape of the mold, and the workpiece is left in the mold until it has cooled off. A flexible heating core is used to apply heat to the interior of the workpiece. The heating core has an insulating jacket with a sliding layer on its outer wall and a heating conductor winding located within the insulating jacket. A stress relief extends lengthwise in the middle of the heating core and outward of the heating core at one end. A receptacle is provided at the other end of the heating core for the stress relief.

4 Claims, 3 Drawing Sheets

METHOD FOR SHAPING WORKPIECES FROM THERMOPLASTICS

FIELD OF THE INVENTION

The invention relates to a method and a device for shaping tubular workpieces from thermoplastic plastics.

BACKGROUND OF THE INVENTION

When shaping tubular workpieces from thermoplastic plastics, the procedure is such that the workpiece is placed as a semifinished product in a non-shaped state, in a complex mold, whereupon the entire device is heated in a liquid bath or hot-air furnace and then cooled. The action of heat and subsequent cooling gives the workpiece the shape determined by the mold. A disadvantage of this known method is that the working of the method is associated with high energy consumption. Large amounts of energy are consumed both in heating in the liquid bath and heating in the hot-air furnace. In the bath method, moreover, large amounts of auxiliary substances are consumed, and in the air method long cycle times are always involved. These disadvantageous features also result in high system operating costs, which result in an increased cost for the entire method.

SUMMARY OF THE INVENTION

The goal of the invention is to design a method and device according to the species in such fashion that the method can be worked advantageously and economically while avoiding the above disadvantages.

The method according to the invention is preferably suitable for shaping tubular workpieces from thermoplastic plastics. The workpieces assume any three-dimensional shape after the method has ended. The amounts of heat required for shaping are applied to the workpiece to be shaped from the inside only and the workpiece is thus heated to the softening temperature of the plastic. As a result the macromolecules of the material realign themselves and the workpiece takes on the shape determined by the mold. During the subsequent cooling of the workpiece, which remains in the mold, the molecules become fixed in their position and orientation, so that the workpiece permanently assumes its new shape. Since only the workpiece in the mold is heated, the amounts of energy thus consumed are small. The mold is independent of location and its size is not limited by the method. Thus, elongated tubular workpieces can also be shaped by the method according to the invention without any further problems. Heating the hollow workpiece from the inside using a flexible heating core has proven advantageous. The heating core can be introduced into the workpiece so that it re-emerges at one end.

The method according to the invention is worked in a mold that corresponds to the desired shape of the workpiece and into which the workpiece is inserted. A flexible heating core is inserted into the hollow workpiece. A control or monitoring device for monitoring the time and temperature can also be provided. The mold into which the workpiece is inserted can advantageously surround only 50% of the contour of the workpiece so that it can easily be inserted. Then the workpiece can be gripped at certain points by suitable handles made dimensionally stable and resistant to forces. The material of which the mold is composed is chosen as a function of the heat-insulating requirements. It can be made of metal, coated metal, thermally stressable plastic, glass, etc.

In the simplest case, the heating process is controlled by a timer switch. A time is determined empirically after which the current must be switched off, so that the workpiece is not heated any further. Regulating devices can also be provided which switch or limit the current as a function of the temperature recorded from the molded part.

According to the invention, a flexible heating core is used to work the method, said core being inserted into the hollow workpiece. The core consists of an insulating jacket in which a heat conductor winding is located. The heat conductor winding can be powered by low voltage or normal voltage, by direct current or alternating current. The low energy levels required to heat the heating conductor winding and the use of voltages below 50 volts make the use of the heating core according to the invention a problem-free procedure. A flow of material for production engineering can be developed and expanded using batteries independent of the power line. The insulating jacket advantageously consists of TEFLON or glass silk. It is provided with a sliding layer o its outside wall. The sliding layer makes it easier to insert the heating core into the workpiece and is advantageously composed of TEFLON. A stress relief extends lengthwise in the middle of the heating core and advantageously consists of a steel cable or wire braid. The stress relief is fastened at one end by a suitable receptacle in the heating rod and extends outward at the other end.

By making the design such that the heating core comprises a radially expandable jacket and by the fact that a chamber to receive liquid media in particular is formed between the insulating jacket and the outer jacket, the method is performed in such fashion that the heating core is first introduced into the workpiece to be shaped, with its cross section being smaller than that of the tubular workpiece to be shaped, and by the fact that a liquid medium is then pumped into the heating core chamber, which causes the outer jacket to expand. This measure not only makes it possible to insert the heating core easily into any workpiece to be shaped but it is also especially advantageous that only a single heating core can be used for workpieces of different cross section. After the shaping process is complete, the liquid medium is pumped out of the heating core chamber and the heating core can be pulled especially simply and without expenditure of effort from the shaped workpiece. Another advantage of the design of the heating core according to the invention is that the heat transfer between the tubular workpiece to be shaped and the heating core is better, because there is no air gap between the walls of the tool and those of the workpiece, since the dimensions of the heating core can be adjusted very precisely to suit those of the workpiece to be shaped.

It is advantageous to use oil as the liquid medium since this medium results in an especially favorable heat transfer within the heating core, all the way to its outside skin.

The design of the invention provides that the outer skin of the radially expandable outer jacket is provided with a sliding layer or that the outer jacket consists of a sliding material. This can be TEFLON, silicone, or the like.

The outer shape of the heating rod is slightly smaller than the inside contour of the workpiece to be shaped, which has the advantage of a simpler introduction of the heating rod into the workpiece to be shaped.

Provision can also be made such that the heating core consists of a tube in which a heatable medium is located. This embodiment is especially valuable when the softening temperatures of the plastic are in the lower ranges.

DESCRIPTION OF THE DRAWINGS

In the following figures, one embodiment of the device according to the invention is shown.

DETAILED DESCRIPTION OF THE INVENTION

Figure 1:
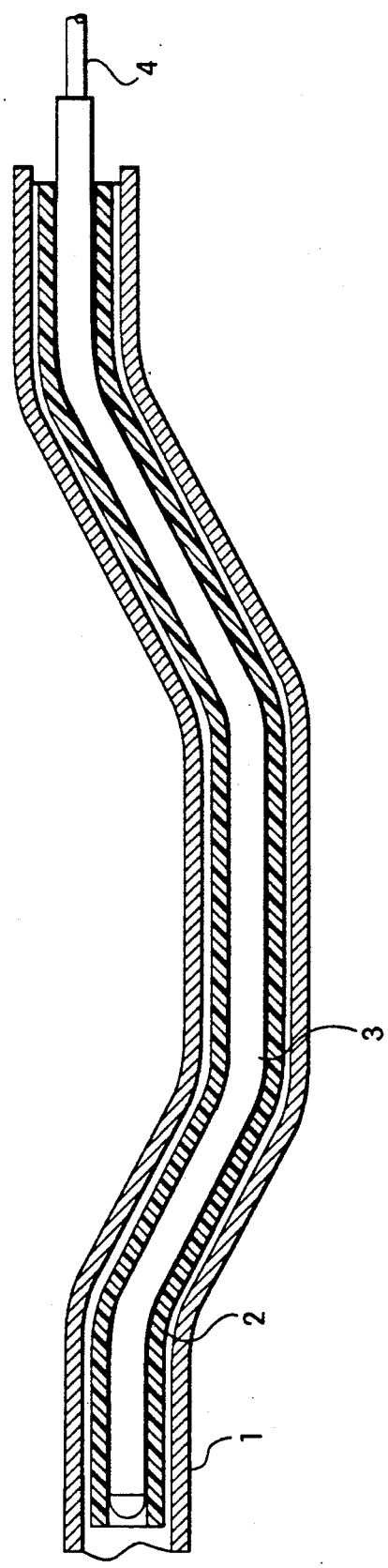
FIG. 1 shows a mold with a workpiece to be shaped, inserted thereinto, and a heating core.

FIG. 1 shows a mold 1 with a workpiece 2 to be shaped and inserted thereinto and a flexible heating core 3. Mold 1 has a shape like that which finished workpiece 2 is to assume later. Flexible heating core 3 is located inside workpiece 2. Stress relief 4 of heating core 3 emerges from mold 1 and workpiece 2.

Figure 2:
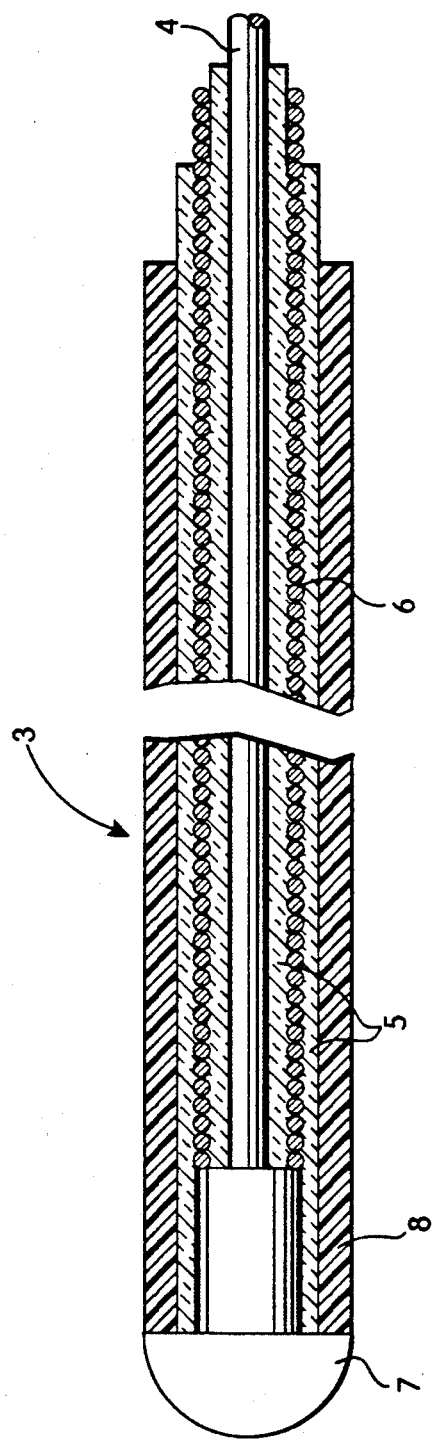
FIG. 2 is a flexible heating core.

FIG. 2 shows the flexible heating core 3 according to the invention. Heating core 3 has an insulating jacket 5, a heat conducting winding 6, and a stress relief 4. Stress relief 4 extends lengthwise through heating core 3 and is located in its center. Heating core 3 also has a receptacle 7 for stress relief 4. Insulating jacket 5, preferably made of TEFLON or glass silk, is provided with a sliding layer 8 on its outer wall. Sliding layer 8 is preferably made of TEFLON.

Figure 3:
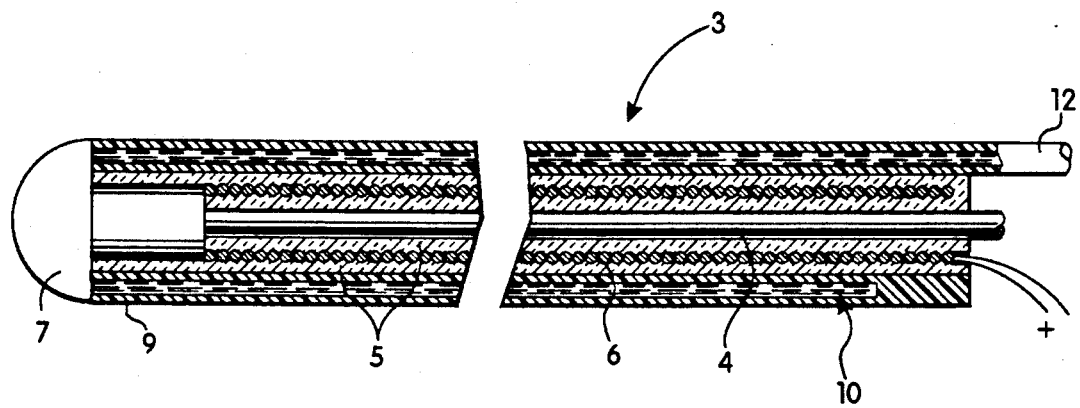
FIG. 3 is another embodiment of the flexible heating core before the shaping process.
Figure 4:
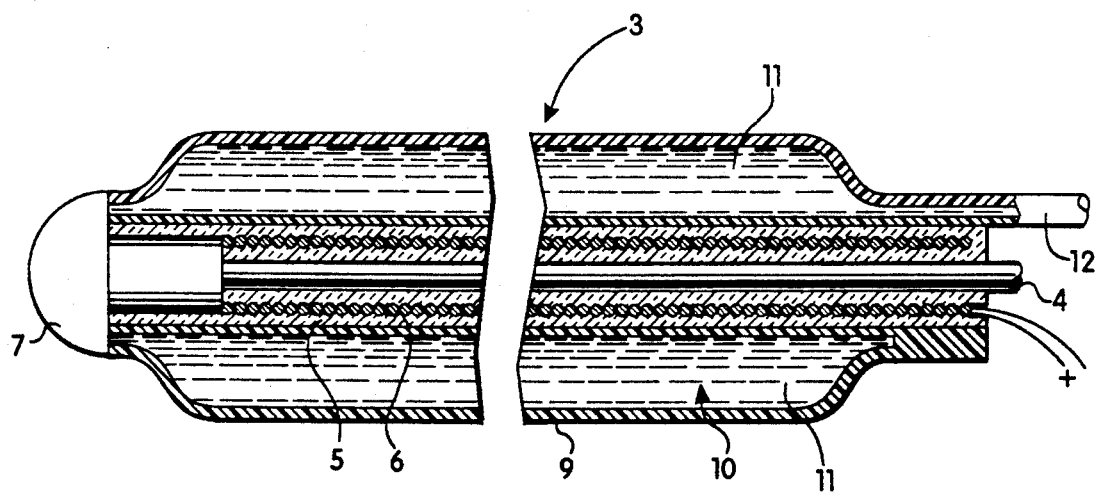
FIG. 4 shows the flexible heating core in the embodiment according to FIG. 3 but during the shaping process.

According to an embodiment shown in FIG. 3, flexible heating core 3 has a radially expandable outer jacket 9, a heating conductor winding 6, an insulating jacket 5, a stress relief 4, and a chamber 10 located between insulating jacket 5 and outer jacket 9. Chamber 10 is filled with a liquid medium 11, oil for example, added through connecting line 12. Outer jacket 9 then expands and matches the diameter of workpiece 2 to be shaped. Chamber 10 is filled with the quantity of liquid medium 11 that is necessary to adjust heating core 3 to the diameter of the workpiece to be formed. This condition is shown in FIG 4. In FIG. 3, the condition is shown as it is before the shaping process, during insertion of heating core 3 into workpiece 1 to be shaped, and after the end of the shaping process.

We claim:

1. A method for shaping a tubular workpiece from thermoplastic plastics in a mold under the action heat, comprising:

applying an amount of heat required for shaping the workpiece to the workpiece to be shaped from the interior, heating the workpiece to the softening temperature of the plastic, maintaining the softening temperature until the workpiece assumes the shape determined by the mold, and leaving the workpiece in the mold until the workpiece has cooled off.

2. The method according to claim 1 wherein the heat applied to the hollow workpiece to be shaped is supplied from the interior through a flexible heating core.

3. A method of claim 1 wherein the heat required for shaping the workpiece is applied with a flexible heating core comprising an insulating jacket, a heating conductor winding located within the insulating jacket, and a sliding layer on the outside of the insulating jacket.

4. The method of claim 3 wherein the flexible heating core further comprises a stress relief extending lengthwise of the heating core.

* * * * *